F. L. MORRIS.
TROLLEY WHEEL AND BEARING THEREFOR.
APPLICATION FILED AUG. 28, 1916.

1,269,951.

Patented June 18, 1918.

Witnesses
Gertrude Nicholson
J. M. Mitchell

Inventor
F. L. Morris.
By Fetherstonhaugh & Co.
attys.

UNITED STATES PATENT OFFICE.

FREDERICK LIVINGSTONE MORRIS, OF HAMILTON, ONTARIO, CANADA.

TROLLEY-WHEEL AND BEARING THEREFOR.

1,269,951.  Specification of Letters Patent.  Patented June 18, 1918.

Application filed August 28, 1916. Serial No. 117,380.

*To all whom it may concern:*

Be it known that I, FREDERICK LIVINGSTONE MORRIS, of the city of Hamilton, in the county of Wentworth, in the Province of Ontario, Canada, a subject of the King of Great Britain, have invented certain new and useful Improvements in Trolley-Wheels and Bearings Therefor, of which the following is the specification.

My invention relates to improvements in wheels and bearings therefor and the object of the invention is to devise a wheel and bearing therefor in which the friction on the bearing axle will be reduced to a minimum and thereby materially increase the mileage of the wheel and consequently decrease the up keep and further to insure the bearings being lubricated to a maximum extent and it consists essentially of the following arrangement and construction of parts as hereinafter more particularly explained by the following specification.

In the drawings like characters of reference indicate corresponding parts in each figure.

Figure 1:
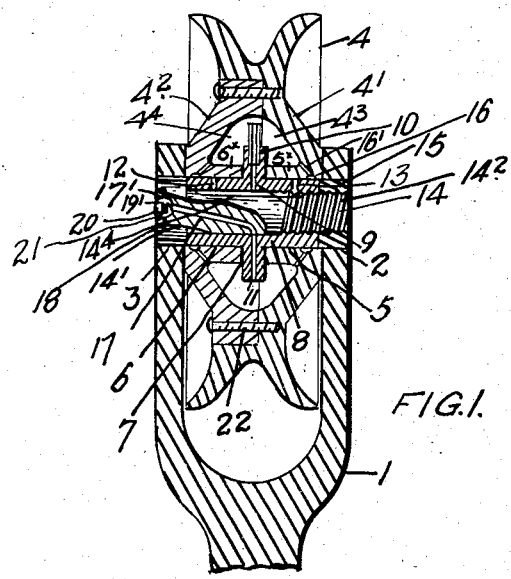
Figure 1 is a sectional view through a trolley wheel and supporting half of my bearing.
Figure 3:
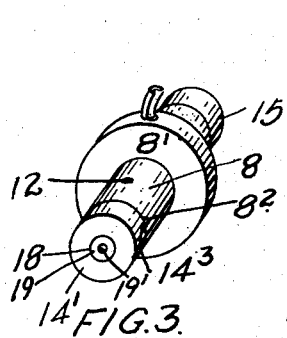
Fig. 3 is a perspective detail of the bearing sleeve.
Figure 4:
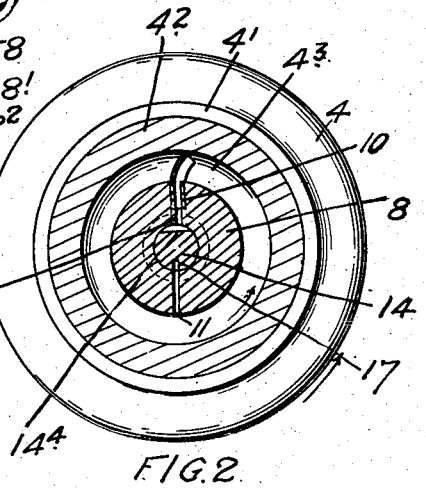
Fig. 4 is a perspective detail of the parts shown in Fig. 3 separated.
Figure 2:
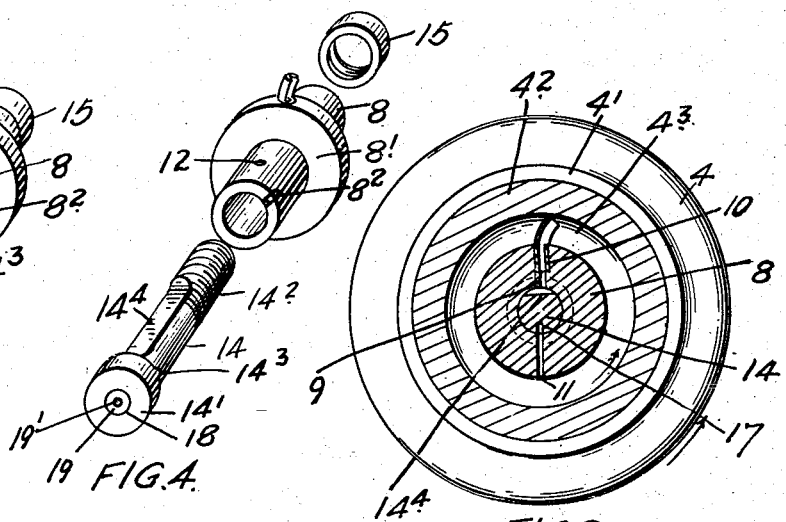
Fig. 2 is a sectional view on the vertical center of Fig. 1.
Figure 5:
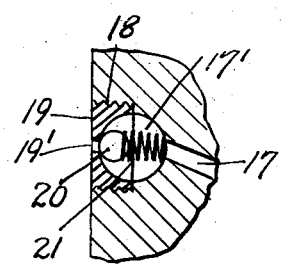
Fig. 5 is a sectional enlarged view of a detail.

1 indicates a harp for supporting a trolley wheel and which is secured in the usual manner to the upper end of the trolley pole, such harp being provided with the usual bearing orifices 2 and 3. 4 indicates the trolley wheel comprising two portions $4^1$ and $4^2$ each provided in its interior face with undercut annular grooves $4^3$ and $4^4$ which, when the parts $4^1$ and $4^2$ are secured together, form an annular oil channel concentric with the center of the wheel. 5 and 6 indicate holes formed centrally through the members $4^1$ and $4^2$, the inner ends of the walls $5^x$ and $6^x$ of which are spaced apart forming an annular intervening space 7. 8 indicates a sleeve provided with an annular flange $8^1$ centrally of its length. The portions of the sleeve extending from each side of the annular flange $8^1$ fit into the openings 5 and 6 of the trolley wheel members $4^1$ and $4^2$, the annular flange $8^1$ extending outwardly through the space 7 into the annular channel formed by the undercut grooves $4^3$ and $4^4$. 9 indicates a bore extending vertically down from the outer periphery of the flange $8^1$ into the center of the sleeve 8. The upper end of the bore 9 is enlarged and 10 indicates a tube fitting into such enlarged portion, the upper end of such tube being cut away to form a scoop extending outwardly from the periphery of the disk $8^1$ and bent forward in a direction opposite to the rotation of the trolley wheel as indicated clearly in Fig. 2.

11 indicates a vertical bore extending through the flange $8^1$ diametrically opposite to the tube 10. 12 and 13 indicate perforations formed in the sleeve 8 at each side of the flange $8^1$. 14 indicates a central bolt provided with a cylindrical head $14^1$ at one end of the same diameter as the sleeve 8. The opposite end of the bolt 14 is threaded at $14^2$. 15 indicates a cylindrical nut of the same diameter as the sleeve 8. The nut 15 is screwed on to the threaded end of the bolt 14 against the end of the sleeve 8. $14^3$ indicates a projection extending inwardly from the inner face of the head $14^1$. $8^2$ indicates a recess formed in the end of the sleeve 8 into which the projection $14^3$ fits when the parts are assembled. The bolt 14 is provided with a flattened portion $14^4$ extending longitudinally thereof and forming an oil space between the bolt and the interior of the sleeve 8 from which the perforations 12 and 13 extend.

16 indicate annular grooves formed in the interior periphery of the trolley wheel openings in proximity to the outer face of the wheel. $16^1$ indicate inclined ducts leading from the annular grooves 16 into the annular channels formed by the annular oil channel $4^3$ and $4^4$. 17 indicates an oil feed channel extending through the bolt 14 having a curved inner end leading into the duct 11 and an enlarged outer end $17^1$. 18 indicates an internally threaded recess surrounding the enlarged end of the duct 17. 19 indicates a nut threaded into such enlarged recess and provided with a central feed perforation $19^1$ against which a ball 20 is normally seated by means of a spiral compression spring 21. The headed end of the bolt 14 and the nut 15 are suitably secured in the openings 2 and 3 of the harp so as to be non-rotatable therein. 22 indicate screws by which the members of the trolley wheel 4¹ and 4² are secured together.

Having described the principal parts involved in my invention I will briefly describe the operation of the same. Oil is fed into the wheel by forcing the tip of the oil can against the ball 20 and unseating it. The oil passes downwardly from the enlarged portion of the duct 17 through the duct 17 and down through the duct 11 into the oil channel formed by the grooves 4³ and 4⁴. When the wheel is rotated in the direction of arrow the oil in the oil channel has a tendency to travel in the same direction and some of the oil which is carried up over the top of the central portion of the wheel is caught by the tube 10 which acts as a scoop feeding the oil down through the duct 9 into the space formed by the flattened portion 14⁴ of the bolt 14 and the interior periphery of the sleeve 8. The oil then flows longitudinally of this flattened portion to the perforations 12 and 13 and is carried upwardly through such perforations from around the outside of the sleeve 8 and between it and the central portion or hub of the wheel.

As before stated the sleeve 8 is held in a stationary position and the central portion of the wheel revolves thereon. Any superfluous oil then passes into the grooves 16 and is carried by circumferential force outwardly through the inclined duct 16¹ back into the oil channel. By this means it will be seen that those parts of the wheel and bearing pin, which are under friction, are kept constantly supplied with oil thereby increasing the life of the wheel and decreasing the cost of up keep. It will be readily understood that such construction might be equally well applied to loose pulleys and devices of a similar class.

Although I have described my invention as applied to trolley wheels it will of course be understood that it may with equal facility be applied to other wheels in which perfect lubrication is essential such as pulleys.

What I claim as my invention is:

1. In a trolley, the combination with a bearing support and the wheel, of an annular chamber within the wheel, a sleeve secured at the ends in the support forming a bearing on which the wheel rotates, and provided with a central radial passageway a pin extending through the sleeve and suitably secured therein and provided with a flattened portion, a scoop extending upwardly from the center of the sleeve and passageway, said scoop communicating with the recess formed by the flattened portion of the pin, the sleeve being provided with perforations disposed on each side of the central passageway leading from said recess to the outside bearing surface of the sleeve.

2. In a trolley the combination with a bearing support and the wheel, of an annular chamber in said wheel, a sleeve secured at the ends in the support forming a bearing on which the wheel rotates and provided with a central radial passageway, a pin extending through the sleeve and suitably secured therein and provided with a flattened portion, a scoop extending upwardly from the center of the sleeve and passageway, said scoop communicating with the recess formed by the flattened portion of the pin, the sleeve being provided with perforations disposed on each side of the central passageway leading from said recess to the outside bearing surface of the sleeve, said pin having a longitudinal opening extending therethrough from one end, and the sleeve being provided with a registering opening leading outwardly into the annular chamber.

FREDERICK LIVINGSTONE MORRIS.

Witness:
C. B. ELKINGTON.